US007396864B2

(12) United States Patent
Salenbien

(10) Patent No.: US 7,396,864 B2

(45) Date of Patent: Jul. 8, 2008

(54) INK JET INK COMPOSITION AND METHOD OF PRINTING

(75) Inventor: Deena L Salenbien, Maybee, MI (US)

(73) Assignee: Jetrion, L.L.C., Ypsilanti, MI (US)

( * ) Notice: Subject to any disclaimer, the term of this patent is extended or adjusted under 35 U.S.C. 154(b) by 428 days.

(21) Appl. No.: 10/899,267

(22) Filed: Jul. 26, 2004

(65) Prior Publication Data

US 2005/0032932 A1 Feb. 10, 2005

Related U.S. Application Data

(60) Provisional application No. 60/492,772, filed on Aug. 5, 2003.

(51) Int. Cl.

| | |
|---|---|
| ***B41J 2/01*** | (2006.01) |
| ***B41J 2/17*** | (2006.01) |
| ***B41J 2/175*** | (2006.01) |
| ***C04B 24/26*** | (2006.01) |
| ***C08J 3/00*** | (2006.01) |
| ***C08K 5/00*** | (2006.01) |
| ***C08L 27/00*** | (2006.01) |
| ***C08L 31/04*** | (2006.01) |
| ***C08L 31/02*** | (2006.01) |
| ***C08F 214/06*** | (2006.01) |
| ***C09D 5/00*** | (2006.01) |
| ***G01D 11/00*** | (2006.01) |

(52) U.S. Cl. .................. 523/160; 106/31.6; 106/31.85; 347/1; 347/85; 347/95; 347/100; 523/161; 524/515; 524/524; 524/563; 524/567

(58) Field of Classification Search ................ 523/160, 523/161; 347/1, 85, 95, 100; 106/31.6, 31.85; 524/515, 524, 563, 567

See application file for complete search history.

(56) References Cited

U.S. PATENT DOCUMENTS 4,465,800 A * 8/1984 Bhatia ........................ 524/236
4,803,119 A * 2/1989 Duff et al. ................ 428/321.3
5,104,448 A 4/1992 Kruse
5,154,761 A 10/1992 Cooke et al.
5,160,535 A 11/1992 Cooke et al.
5,376,169 A * 12/1994 Hotomi et al. .............. 524/104
5,393,331 A 2/1995 Loria et al.
5,443,628 A * 8/1995 Loria et al. .............. 106/31.65
5,510,415 A * 4/1996 Zahrobsky et al. .......... 524/506
5,725,985 A * 3/1998 Nealey et al. ............ 430/58.05
5,739,833 A * 4/1998 Yamazaki et al. ........... 347/100
5,985,079 A * 11/1999 Ellison .................. 156/244.23
6,048,914 A * 4/2000 Goto et al. .................. 523/161
6,113,679 A 9/2000 Adkins et al.
6,231,654 B1 * 5/2001 Elwakil ................... 106/31.47
2002/0029723 A1 * 3/2002 Fox et al. ................. 106/31.86
2004/0201661 A1 * 10/2004 Li ............................. 347/101

FOREIGN PATENT DOCUMENTS

EP 1367101 A1 * 12/2003
WO WO 2002/055619 A1 * 7/2002

OTHER PUBLICATIONS

US Environmental Protection Agency, Air Toxics Website [online], Original List of Hazardous Air Pollutants [retreived on Nov. 21, 2006]. Retreived from the Internet <URL:http://www.epa.gov/cgi-bin/epaprintonly.cgi>.*

* cited by examiner

*Primary Examiner*—Patrick D Niland
(74) *Attorney, Agent, or Firm*—Harness, Dickey & Pierce, P.L.C.

(57) ABSTRACT

A HAPs-free ink jet ink includes a pigment; a binder comprising vinyl chloride-vinyl acetate copolymer; and a HAPs-free solvent component comprising 1-methoxy-2-propanol acetate, a dispersing solvent selected from cyclohexanone, n-propyl acetate, n-butyl acetate, diisobutyl ketone, isobutyl acetate, amyl acetate, and combinations of these, and a diluent solvent selected from dipropylene glycol methyl ether, dipropylene glycol methyl ether acetate, tripropylene glycol methyl ether, ethylene glycol diacetate, propylene glycol n-butyl ether, propylene glycol n-propyl ether, and combinations of these. The ink has excellent stability and printing properties. Printing with the ink avoids release of HAPs while allowing long print runs with low maintenance.

16 Claims, No Drawings

INK JET INK COMPOSITION AND METHOD OF PRINTING

FIELD OF THE INVENTION

The invention relates to ink jet inks and methods of ink jet printing.

BACKGROUND OF THE INVENTION

Ink jet inks must have a very low viscosity, typically less than about 20 centipoise at the jetting temperature. While hot melt inks have been used, liquid inks are generally more suited to high volume industrial printing. To achieve this low viscosity, liquid ink jet inks must either be aqueous or include a substantial amount of organic liquids. The low viscosity of ink jet inks also makes it more difficult to maintain a stable pigment dispersion. This problem may be avoided by using dyes that dissolve in the liquid medium, but it is advantageous to use pigment instead of dyes for other reasons, including lightfastness and permanency of the printing. However, the organic solvents that are employed in ink jet ink formulations to obtain stable pigment dispersions with good printing characteristics have to date included materials designated as hazardous air pollutants. The U.S. Federal 1990 Clean Air Act Amendments targeted certain compounds as hazardous air pollutants (HAPs) for special regulation. For example, the Amendments directed the EPA to establish emissions standards based on the use of "maximum achievable control technology" (MACT). While as yet only certain businesses are subject to the regulations, other businesses may wish to minimize or eliminate use of HAPs materials to avoid exposure to those materials.

Therefore, there is a need for an ink jet ink and an ink jet ink set for full-color printing (e.g., CMYK ink set) that avoids HAPs emissions during printing and yet has advantageous properties such as a viscosity suitable for ink jet printing, stable pigment dispersion, lightfastness, compatibility with industrial printer components, that can be printed on a wide range of substrates, and that can be printed with low maintenance (e.g., cleaning or replacing equipment). It is thus an object of the invention to provide an ink jet ink that is free of hazardous air pollutant compounds and a method of ink jet printing that does not release hazardous air pollutant emissions and provides these desirable ink characteristics.

SUMMARY OF THE INVENTION

The present invention provides an ink jet ink that is free of hazardous air pollutant compounds (HAPs). The ink jet ink includes a pigment, a binder that includes at least poly(vinyl chloride-covinyl acetate), and a HAPs-free solvent component. The HAPs-free solvent component contains 1-methoxy-2-propanol acetate; a dispersing solvent selected from cyclohexanone, n-propyl acetate, n-butyl acetate, diisobutyl ketone, isobutyl acetate, amyl acetate, and combinations of these; and a diluent solvent selected from dipropylene glycol methyl ether, dipropylene glycol methyl ether acetate, tripropylene glycol methyl ether, ethylene glycol diacetate, propylene glycol n-butyl ether, propylene glycol n-propyl ether, and combinations of these. The ink jet inks of the invention include an effective amount of the dispersing solvent to maintain the pigment in a stable dispersion. The ink jet inks of the invention also contain an effective amount of the HAPs-free solvent component to provide a jettable vehicle with desirable characteristics such as color density and viscosity.

The ink of the invention has excellent printing properties, including producing a high quality image with minimal drop satellite formations and optimal dot gain. The ink can be printed during long print runs with little maintenance of the equipment to sustain printing.

In another embodiment, the invention provides an ink jet ink that includes a pigment, a binder that includes at least poly(vinyl chloride-co-vinyl acetate) and an acrylic copolymer having a Tg of at least about 50° C., and the HAPs-free solvent component as already described. The ink has excellent outdoor durability, color retention, and solvent resistance. The ink is also advantageous in avoiding blocking on substrates such as vinyls or other plastics.

In a further embodiment, the invention provides an ink jet ink that includes a pigment, a binder that includes at least poly(vinyl chloride-co-vinyl acetate) and a polyketone resin.

In a still further embodiment, the HAPs-free solvent component of the invention contains 1-methoxy-2-propanol acetate; a dispersing solvent selected from cyclohexanone, n-propyl acetate, n-butyl acetate, diisobutyl ketone, isobutyl acetate, amyl acetate, and combinations of these; and a diluent solvent including at least dipropylene glycol methyl ether acetate. This embodiment is particularly effective for ink jet printing on paper, where improved absorption of the ink overcomes dripping and bleeding problems, even for printing on upright (verticle) paper surfaces.

The invention further provides an ink jet printing method in which an ink jet printer prints the ink jet ink of the invention onto a substrate. The printing method avoids release of HAPs materials and provides sustained high volume printing on many substrates with low maintenance requirements.

"A" and "an" as used herein indicate "at least one" of the item is present; a plurality of such items may be present, unless the context clearly dictates otherwise. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value. "Binder" refers to the resinous or polymeric portion of the ink. "HAPs-free" is used herein to indicate that a composition does not include compounds listed in the Federal 1990 Clean Air Act Amendments as hazardous air pollutants (HAPs).

DETAILED DESCRIPTION OF THE PREFERRED EMBODIMENTS

The following description of the preferred embodiment(s) is merely exemplary in nature and is in no way intended to limit the invention, its application, or uses.

The HAPs-free ink jet ink includes a pigment, a binder that includes at least poly(vinyl chloride-covinyl acetate), and a HAPs-free solvent component.

The pigment or pigments in the ink may be any of those suitable for ink jet inks. In general, pigments for ink jet inks have a maximum particle size that is small enough to avoid clogging the ink jets during printing. The pigments preferably have a narrow particle size distribution. Among those that may be mentioned are C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I. Pigment Red 122, 202, 254, and a solid solution of C.I. Pigment Red 122 and 202; C.I. Pigment Blue 15:3 and 15:4; C.I. Pigment Violet 19, 23 and 33; C.I. Pigment Black 7. The ink jet inks are preferably used in a set that provides for full-color printing of images. In one preferred embodiment, an ink set including cyan, magenta, yellow, and black (CMYK) inks is used. For example, yellow, C.I. Pigment Yellow 138, 151, 154, 180 and 185 may be used in the yellow ink; C.I. Pigment Red 122 and 202, 254, and C.I. Pigment Violet 19 may be used in the magenta ink; C.I. Pigment Blue 15 may be used in the cyan ink; and an acidic or neutral pigment of C.I. Pigment Black 7 may be used in the black ink.

The pigments may be provided with a surface treatment to aid in dispersing the pigment and/or in stabilizing the dispersion of the pigment. In general, no separate dispersants are needed. In particular, surfactants and dispersants should not be included at levels that affect the surface tension of the ink, as changing the surface tension of ink may adversely affect the quality of the print by making it difficult to control drop spread. In other cases it may be advantageous to include a modest amount of a dispersant, for example to use a solution of a high molecular weight block copolymer as a stabilizing agent with yellow pigments.

The amount of pigment included in the ink will depend on, for example, which pigment is used. In general, the ink jet ink contains from about 0.5 to about 15% by weight of pigment. While a sufficient amount of pigment is included to attain the desired color density of the ink, including more pigment also tends to increase viscosity. Suitable pigments are available, for example and without limitation, from Clariant Corporation of Coventry, Rhode Island and Ciba Specialty Chemicals Corp. of Basel, Switzerland.

The HAPs-free ink jet ink composition binder includes at least poly(vinyl chloride-co-vinylacetate). Preferred examples of the poly(vinyl chloride-co-vinyl acetate) include, without limitation, those having a weight average molecular weight of from about 15,000 to about 44,000 and a glass transition temperature of from about 40 to about 80° C. Suitable poly(vinyl chloride-co-vinyl acetate) polymers may be used as solutions in one of the solvents of the HAPs-free solvent component and are commercially available, for example from Union Carbide of Danbury, Conn.

The binder may include one or more further resins and polymers. In one preferred embodiment, the binder further includes an acrylic copolymer. The acrylic copolymer preferably has a glass transition temperature ($T_g$) of at least about 50° C., preferably at least about 80° C., and even more preferably at least about 100° C. The $T_g$ of the acrylic copolymer cannot be so high that the acrylic copolymer cannot be successfully incorporated into the ink jet ink or requires too much solvent in the ink to obtain a suitable printing viscosity. In general, the acrylic copolymer has a glass transition temperature ($T_g$) of up to about 150° C., preferably up to about 130° C., and even more preferably up to about 115° C.

In another embodiment, the ink may include a polymer, particularly one with a $T_g$ of about 20° C. to about 50° C., with sufficient hydrophilicity to provide desirable adhesion properties with a water-based adhesive. For example, acrylic copolymers and vinyl copolymers, particularly acrylic and vinyl resins with acid-functional or acrylamide comonomers, may be formulated to have the desired hydrophilicity. The degree of hydrophilicity should be balanced to ensure that the ink remains waterfast.

Illustrative examples of suitable acrylic copolymers include, without limitation, methyl methacrylate copolymers that are soluble in the HAPs-compliant (non-HAPs) glycol ethers and/or glycol ether esters of the HAPs-free solvent component.

It is advantageous to include the acrylic copolymer in the ink when the final printed image is to be used in outdoor applications in which durability, color retention, and/or solvent resistance is important. It is particularly desirable to include the acrylic copolymer when printing vinyl, other plastic, or other non-porous substrates to avoid blocking and provide excellent adhesion.

When the binder includes both the poly(vinyl chloride-co-vinyl acetate) and the acrylic copolymer and/or the polyketone resin, it is preferred to have, based on the combined weights of the poly(vinyl chloride-co-vinyl acetate) and the acrylic copolymer and/or polyketone resin, from about 60 to about 90 weight percent, more preferably from about 70 to about 80 weight percent, of the poly(vinyl chloride-co-vinyl acetate).

The HAPs-free solvent component contains 1-methoxy-2-propanol acetate as solubilizing solvent; a dispersing solvent selected from cyclohexanone, n-propyl acetate, n-butyl acetate, diisobutyl ketone, isobutyl acetate, amyl acetate, and combinations of these; and a diluent solvent selected from dipropylene glycol methyl ether, dipropylene glycol methyl ether acetate, tripropylene glycol methyl ether, ethylene glycol diacetate, propylene glycol n-butyl ether, propylene glycol n-propyl ether, and combinations of these.

The appropriate dispersing solvent for a particular ink composition depends upon the nature of the pigment or pigments in the ink composition; for example, it should be selected for compatibility with any pigment surface treatment. The ink jet inks of the invention include an effective amount of the dispersing solvent to maintain the pigment in a stable dispersion. The ink jet inks of the invention also contain an effective amount of the HAPs-free solvent component to provide an appropriate viscosity for ink jet printing.

For printing on paper substrates, the HAPs-free solvent component preferably contains dipropylene glycol methyl ether acetate as a diluent solvent. The dipropylene glycol methyl ether acetate is particularly effective in preventing dripping or bleeding of the ink jet ink, even when the paper substrate is printed in an upright or verticle position.

The solubilizing solvent, dispersing solvent, and diluent solvent are combined in proportions and amounts selected so that the ink will not clog the jets and that provides good printing properties, including printing a high quality image with minimal drop satellite formations and with optimal dot gain. The inks print with little maintenance to sustain the ink jets during long print runs.

It is also desirable to select and apportion the solvents to achieve a suitable solvent volatility, as too high of an evaporation rate reduces reliability of the printer due to drying of the ink in the nozzles, and too low an evaporation rate will not allow the printed image to timely dry, particularly on a non-absorbent substrate such as vinyl substrates. Thus, it is preferred that any solvent that is 20% or higher by weight of the ink should have an evaporation rate (versus butyl acetate) of from about 0.2 to about 0.005.

The ink may further include suitable additives that would not interfere with the stability of the ink or dot gain on printing the ink, such as wetting agents, dyes, and/or plasticizers. If the ink is formulated as a CIJ (continuous ink jet) ink, then an electrolyte is added to the ink. The ink jet ink may contain a small amount of absorbed water, but water is not a substantial component of the solvent package and the ink is nonaqueous.

The ink of the invention may be prepared by combining the solubilizing solvent, the dispersing solvent, and the poly(vinyl chloride-co-vinyl acetate). The pigment is added to this combination and mixed with a high shear disperser until the pigment is stably dispersed. The diluent solvent, optionally, the one or more further resins and polymers (such as an acrylic copolymer and/or a polyketone resin), and optionally one or more conventional additives are added to the pigment dispersion to make the finished ink composition. A sufficient amount of diluent solvent is included to provide the desired viscosity. For printing paper substrates, a sufficient amount of dipropylene glycol methyl ether acetate is included as diluent solvent to provide the desired printing properties (e.g., printing without bleeding or dripping).

The solvent component provides an ink with excellent stability. The ink may be said to be stable when there is no pigment flocculation after storing an ink sample at 45° C. for 28 days. Stability of the ink may be determined by comparing the time it takes for a 20-gram sample of the ink to pass through a 47 mm, glass fiber, 1.0 micron filter disk from the Pall Corporation (ULTIPOR GF+) before and after storing the ink at 45° C. for 28 days. The ink is sufficiently stable if the filtration time after the 28-day heated storage is within 20% of the filter time before the 28-day heated storage. Stability may also measured by monitoring viscosity over a 28-day period using a Brookfield DV-1+viscometer with a ULA adapter. The stability is determined by recording the viscosity at 30 rpm periodically throughout the 28-day test cycle. Samples stored at room temperature and samples stored at 45° C. are observed for viscosity changes. A change of 5% or less from the initial viscosity is considered stable. Any viscosity changes greater than 5% of the initial recording are considered unstable The ink of the invention may be printed with drop-on-demand (impulse) ink jet printers, valve-jet printers, or, if an electrolyte is included and the ink viscosity adjusted appropriately, with continuous stream ink jet printers. In continuous stream ink jet systems, ink is emitted in a continuous stream under pressure through at least one orifice or nozzle. The stream is perturbed by a piezoelectric transducer, causing it to break up into droplets at a fixed distance from the orifice. At this break-up point, the droplets are charged according to digital data signals. These droplets then pass through an electrostatic field that adjusts the trajectory of each drop, directing the drop either to a specific location on the substrate or back to a gutter for recirculation. In drop-on-demand ink jet printers, a droplet is expelled under pressure from the print head directly to a position on the substrate according to digital data signals. The droplet is formed and expelled only when it is to be jetted onto the substrate.

The method of the invention may be carried out without producing emissions of compounds on the HAPs list and with good printing properties as already mentioned.

A full-color image can be printed with an ink jet printer employing an ink set of the invention, such as cyan, magenta, yellow, and black inks (CMYK). The inks of the invention may be formulated in other or in additional colors to make a desired ink set for full-color printing.

The invention is illustrated by the following examples. The examples are merely illustrative and do not in any way limit the scope of the invention as described and claimed. All parts are parts by weight unless otherwise noted.

EXAMPLES

Example 1

Ink Jet Ink According to the Invention

A mixture of 19 parts by weight of 1-methoxy-2-propanol acetate, 15 parts by weight of cyclohexanone, 2.5 parts by weight of poly(vinyl chloride-co-vinyl acetate) UCAR VAGH (available from Union Carbide Corporation) and 3 parts by weight Pigment Blue 15:3 were combined and mixed with a high shear disperser 60 minutes. To the dispersed pigment mixture was added 59 parts by weight dipropylene glycol methyl ether and 1.5 parts by weight of acrylic resin Paraloid A10S (available from Rohm and Haas, Philadelphia, Pa.). The ink had a viscosity of 10.7 centipoise at 25° C.

The ink of Example 1 was tested for stability by two methods. In the first method, stability was measured by monitoring viscosity of samples stored at room temperature and at 45° C. over a 28-day period using a Brookfield DV-1+viscometer with a ULA adapter. The results are recorded in the following table.

| | Initial | 24 hours | 7 days | 14 days | 21 days | 28 days |
|---|---|---|---|---|---|---|
| Room temperature | 10.7 | 10.8 | 10.6 | 10.6 | 10.6 | 10.9 |
| Elevated temperature (45 C.) | 10.7 | 10.7 | 10.4 | 10.4 | 10.3 | 10.5 |

The measured viscosities indicated that the ink was stable.

Stability was also measured by comparing the time it takes for a 20-gram sample of the ink to pass through a 47 mm, glass fiber, 1.0 micron filter disk from the Pall Corporation (ULTIPOR GF+) before and after storing the ink at 45° C. for 28 days. The filtration times for the ink of Example 1 were:

Initial time, 7.12 seconds;

Time after 28 days at room temperature, 6.98 seconds (decrease of about 2%);

Time after 28 days at 45° C., 7.68 seconds (increase of about 8%).

Again, the test indicated that the ink was stable.

The ink was printed using a drop-on-demand ink jet printer onto vinyl and coated paper substrates. The ink had excellent substrate wetting properties on both the vinyl and the coated paper substrates. There were no film defects, and the adhesion to the substrates was excellent.

Example A

Comparative Ink Jet Ink

A mixture of 18 parts by weight of 1-methoxy-2-propanol acetate, 15 parts by weight of cyclohexanone, 3 parts by weight of the poly(vinyl chloride-covinyl acetate) from Example 1, and 3 parts by weight Pigment Blue 15:3 were combined and mixed with a high shear disperser 60 minutes. To the dispersed pigment mixture was added 59 parts by weight tripropylene glycol n-butyl ether and 2 parts by weight of the acrylic resin of Example 1.

The ink was printed in the same manner as the ink of Example 1 onto vinyl and coated paper substrates. The ink exhibited film defects, and the adhesion to both substrates was poor. The ink also had poor abrasion resistance.

Example 2

Ink Jet Ink According to the Invention

A mixture of 16 parts by weight of 1-methoxy-2-propanol acetate, 15 parts by weight of cyclohexanone, 3 parts by weight of the poly(vinyl chloride-co-vinyl acetate) from Example 1, and 3 parts by weight Pigment Blue 15:3 were combined and mixed with a high shear disperser 60 minutes. To the dispersed pigment mixture was added 61 parts by weight dipropylene glycol methyl ether acetate and 2 parts by weight of the acrylic resin from Example 1.

The ink was printed in the same manner as the ink of Example 1 onto vinyl and coated paper substrates. The ink had excellent film-forming characteristics on both the vinyl and the coated paper substrates. The adhesion to the substrates and abrasion resistance were also excellent.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A Hazardous Air Pollutant (HAPs)-free ink jet ink composition, comprising a pigment, a binder comprising poly(vinyl chloride-co-vinyl acetate) and an acrylic copolymer having a glass transition temperature of at least about 50° C., comprising from about 60 to about 90 weight percent of the poly(vinyl chloride-co-vinyl acetate), based on the combined weights of the poly(vinyl chloride-co-vinyl acetate) and the acrylic copolymer, and a HAPs-free solvent component comprising 1-methoxy-2-propanol acetate;

a dispersing solvent selected from the group consisting of cyclohexanone, n-propyl acetate, n-butyl acetate, diisobutyl ketone, isobutyl acetate, amyl acetate, and combinations of these; and a diluent solvent selected from the group consisting of dipropylene glycol methyl ether, dipropylene glycol methyl ether acetate, tripropylene glycol methyl ether, ethylene glycol diacetate, propylene glycol n-butyl ether, propylene glycol n-propyl ether, and combinations of these.

2. The HAPs-free ink jet ink composition according to claim 1, comprising an effective amount of the dispersing solvent to maintain the pigment in a stable dispersion.

3. The HAPs-free ink jet ink composition according to claim 1, comprising an effective amount of the HAPs-free solvent component to provide an appropriate viscosity for ink jet printing.

4. The HAPs-free ink jet ink composition according to claim 1, wherein the HAPs-free solvent component comprises 15-25% by weight of 1-methoxy-2-propanol acetate and 12-20% by weight of the dispersing solvent.

5. The HAPs-free ink jet ink composition according to claim 1, wherein the poly(vinyl chloride-co-vinyl acetate) has a weight average molecular weight of from about 15,000 to about 44,000 and a glass transition temperature of from about 40 to about 80° C.

6. The HAPs-free ink jet ink composition according to claim 1, wherein the acrylic copolymer has a glass transition temperature from about 50° C. to about 150° C.

7. The HAPs-free ink jet ink composition according to claim 1, wherein the acrylic copolymer is a methyl methacrylate copolymer.

8. The HAPs-free ink jet ink composition according to claim 1, further including a polyketone resin.

9. The HAPs-free ink jet ink composition according to claim 1, wherein the diluent solvent comprises dipropylene glycol methyl ether acetate.

10. The HAPs-free ink jet ink composition according to claim 1, further comprising an electrolyte.

11. An ink set, comprising cyan, magenta, yellow, and black inks according to claim 1.

12. An ink set, comprising cyan, magenta, yellow, and black inks according to claim 9.

13. A method of ink jet printing, comprising printing with an ink jet printer an ink according to claim 1 onto a substrate.

14. A method of ink jet printing, comprising printing with an ink jet printer an ink according to claim 9 onto a paper substrate.

15. A method of ink jet printing comprising printing a full color image with the ink set of claim 11.

16. A method of ink jet printing comprising printing a full color image with the ink set of claim 12 onto a paper substrate.

* * * * *